Patented Mar. 2, 1954

2,671,121

UNITED STATES PATENT OFFICE 2,671,121

PREPARATION OF 2-ALKYL-1-ALKENES

Fred W. Banes, Westfield, and William P. Fitz Gerald, Elizabeth, N. J., assignors to Standard Oil Development Company, a corporation of Delaware No Drawing. Application December 23, 1949, Serial No. 134,876

15 Claims. (Cl. 260—682)

This invention relates to the preparation of 2-alkyl-1-alkenes containing 7 to 36 carbon atoms per molecule. More particularly the invention is concerned with a novel process for the preparation of 2-alkyl-1-alkenes by reacting a mono-alkyl methyl carbinol with ethylene in the presence of a peroxide activator under required temperature and pressure conditions to form 2-alkyl-2-alkanols, and subsequently dehydrating the 2-alkyl-2-alkanols to 2-alkyl-1-alkenes.

2-alkyl-1-alkenes are alpha tertiary mono-olefins of the type:

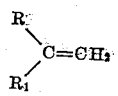

viz., type III olefins according to the Boord classification as described by Schmidt and Boord, Journal Am. Chem. Soc., volume 54, page 751, 1932. 2-alkyl-2-alkanols are alcohols of the type:

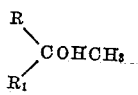

It is an object of this invention therefore to prepare alpha tertiary mono-olefins of the type:

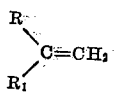

where R is a straight chain alkyl radical of 4-30 carbon atoms and R₁ is an alkyl radical of 1-4 carbon atoms. Olefins of this type are highly desirable because, being of the terminal type, they are highly reactive and enter into such well known reactions as polymerization, oxonation, alkylation, etc. Many of the higher 2-alkyl-1-alkenes prepared according to the process of this invention are new compounds. Type III olefins containing a total of 7 to 36 carbon atoms, preferably 7 to 27 carbon atoms, are particularly desirable as raw materials for chemical synthesis, synthetic lube oils, detergent alkylates, oil-soluble sulfonates, etc.

There is described in Serial No. 130,784 filed December 2, 1949, of which this application is a continuation-in-part, a process whereby alcohols such as methanol, ethanol, isopropanol, the butanols, the pentanols, etc., and also cycloaliphatic alcohols are reacted with such olefins as ethylene, propylene, etc. or mixtures of such olefins in the presence of a peroxide activator to produce alcohols of the type:

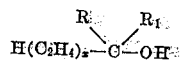

where R and R₁ are hydrogen or alkyl groups and where $x$ is 1-18. When the alcohol employed is a secondary alcohol of the mono-alkyl methyl carbinol type and the olefin is ethylene, the product is a 2-alkyl-2-alkanol of the formula:

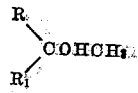

where R is a straight chain alkyl radical of 4 to 30 carbon atoms, preferably 4 to about 24 carbon atoms and R₁ is the hydrocarbon side chain of the original secondary alcohol. Thus in the case of the product made from isopropanol R₁ would be CH₃; from secondary butanol R₁ would be C₂H₅, etc.

It has now been found that 2-alkyl-1-alkenes of the type described may be prepared by reacting a mono-alkyl methyl carbinol with ethylene according to the process described in Serial No. 130,784 filed December 2, 1949, to produce 2-alkyl-2-alkanols of the type:

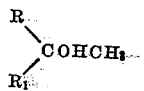

and subsequently dehydrating the latter alcohol of increased molecular weight.

Preparation of 2-alkyl-2-alkanols 2-alkyl-2-alkanols are prepared by reacting a mono-alkyl methyl carbinol with ethylene at temperatures of room temperature to 300° C., preferably 100° C. to 250° C. and at pressures of 50 p. s. i. g. to 2500 p. s. i. g., preferably 250-1500 p. s. i. g., and in the presence of a peroxide activator.

Temperatures much above 300° C. are to be avoided because at this level decomposition of the peroxide activator is too rapid for greatest effectiveness to be realized.

The pressure at which the reaction is carried out depends upon the molecular weight of the alcohol product desired. Generally the pressure ranges cited above are suitable. For example, to produce an average C₁₂ alcohol from ethylene and isopropanol pressures of about 500 to 1000 p. s. i. g. are desirable. Uniform pressure is maintained by continuous addition of the olefin to the reaction zone.

Peroxides or hydroperoxides are employed as activators for the reaction and the temperature of the reaction will depend to some extent upon the particular peroxide employed. Temperatures in the range of 50–250° C. have been found suitable. For example, one can operate in the range of 50–150° C. with activators such as t-butyl hydroperoxide and benzoyl peroxide, and at 125–250° C. with materials such as cumene hydroperoxide and di-t-butyl peroxide. Generally a total of 0.01 to 0.5 part of activator is employed per part of olefin charged to the reactor. The amount of activator employed depends on several factors among which are molecular weight of product desired and method of activator addition to the reaction. When operating a batch process it is preferred that the activator be added in increments to the reactor since in this manner the reaction proceeds more uniformly and better reaction rates and more uniform products are obtained. Suitable peroxides are di-t-butyl peroxide, t-butyl hydroperoxide, benzoyl peroxide, cumene hydroperoxide, hydrogen peroxide, t-butyl perbenzoate, di-t-butyl perphthalate or peradipate, acetyl peroxide, urea peroxide, or mixtures of two or more of the same.

Dehydration of 2-alkyl-2-alkanols

The dehydration is carried out in any manner known to the art, e. g., by thermal dehydration or by catalytic dehydration. The alcohols of the above type yield 2-alkyl-1-alkenes readily by the simple application of heat, however, care should be taken to keep the dehydration temperature below that at which isomerization of the 2-alkyl-1-alkenes takes place. Generally temperatures much above about 350° C. are to be avoided. The dehydration runs smoothly at temperatures of 300–325° C.

Contact agents such as solid phosphoric acid, clay, alumina, bauxite, etc. are also suitable as dehydrating agents. In this method the alcohol is passed through a heated column of the solid maintained at a temperature of 250–350° C., preferably 275–325° C. When using alumina, temperatures below about 325° C. are preferred since at higher temperatures isomerization to beta olefins or type II olefins of the formula R—CH=CH—R tends to occur.

The dehydration may also be carried out by distilling the alcohol in the presence of a catalyst such as the mineral acids, e. g., $H_2SO_4$, $H_3PO_4$, etc. Generally about 0.01 to 0.1 wt. per cent $H_2SO_4$ based on the weight of the alcohol being heated will suffice to cause rapid and smooth dehydration of the alcohol.

The preferred method of carrying out the dehydration consists in the heating the alcohol with a small catalytic amount of $H_2SO_4$ as outlined above and in the presence of an entrainer for the water produced. Cyclohexane is an outstanding carrier for the water, although other entraining agents may be employed such as certain aliphatic ethers, e. g., isopropyl ether, tertiary butyl methyl ether, tertiary butyl ethyl ether, etc., and such compounds as butyraldehyde, ethyl nitrate, etc. Preferably an entrainer is chosen whose aqueous azeotrope boils below the boiling point of the olefin. Even entrainers forming a ternary azeotrope with water and the olefin may be used if desired. Aromatic hydrocarbons of the benzene series are also suitable but the lower members of the series, benzene and toluene, are not preferred because of their tendency to react with the olefin to form alkyl aromatics under the conditions employed for the dehydration.

Typical examples of alcohols produced by reacting mono-alkyl methyl carbinols with ethylene are shown in Table I. In these runs di-tertiary butyl peroxide was employed as the activator. Ethylene was reacted with isopropanol in runs 1 to 6 and run 8, while run 7 was carried out with secondary butanol.

TABLE I

| Run No. | 1 | 2 | 3 | 4 | 5 | 6 | 7 |
|---|---|---|---|---|---|---|---|
| Alcohol | Isopropyl (99%). | Isopropyl (99%). | Isopropyl (99%). | Isopropyl (99%). | Isopropyl (99%). | Isopropyl (99%). | 2-Butanol. |
| Vol. (ml.) | 500 | 1,000 | 1,800 | 1,800 | 1,800 | 1,800 | 1,040. |
| DTBP (Gm.) [1] | 59.5 | 59.5 | 59.5 | 59.5 | 59.5 | 59.5 | 59.5. |
| Wt. Product [2] | 520 | 620 | 750 | 580 | 880 | 1,350 | 650. |
| Reaction Temp. (° C.) | 145–7° C | 145–7° C | 145–7° C | 145–7° C | 165 | 165 | 145. |
| Reaction Press. (p. s. i.) | 1,000 | 1,000 | 1,000 | 500 | 1,000 | 1,500 | 1,000. |
| Alcohol Product Distribution (by distillation), Vol. Percent Overhead: Boiling Point 2-Alkyl-2-alkanols— | | | | | | | |
| <200° C. at 760 mm. ($C_5$–$C_9$) | 17 | 16 | 34 | 55 | 45 | 35 | 15. |
| 200–340° C at 760 mm. ($C_{11}$–$C_{17}$) | 20 | 31 | 29 | 25 | 26 | 25 | 26. |
| >340° C. at 760 mm. ($C_{19}+$) | 63 | 53 | 37 | 20 | 29 | 40 | 60. |

| Run No. | 8 |
|---|---|
| Continuous Reaction | Isopropanol-ethylene. |
| Temperature | 160° C. |
| Pressure | 800 p. s. i. |
| Liquid Feed Rate | 1.27 l./Hr. |
| DTBP Conc. in Liq. Feed [3] | 7.95 g./l. |
| Contact Time in Reactor | 2.75. |
| Percent Alcohol Product in Reactor Effluent | 16.9. |
| Alcohol Product Rate (gms./Hr.) | 200. |
| Alcohol Product: Average Mol Wt | 273. |
| Distribution, Vol. Percent Overhead: | |
| Boiling Point <200° C | 34%. |
| Boiling Point 200–340° C | 32%. |
| Boiling Point >340° C | 34%. |

[1] DTBP—di-t-butyl peroxide. ⅕ added initially, ⅕ added at hours 1, 2, 3 and 4 after reaching reaction temperature. Run terminated after 5 hours reaction time. In a run where all the DTBP was added initially, using the same conditions as run 3, 480 grams of product were recovered.
[2] Product recovered by removing unreacted alcohol at a 3:1 reflux ratio in a 30-plate Oldershaw column.
[3] Solution of di-t-butyl peroxide (DTBP) in 99% isopropyl alcohol.

Alpha tertiary olefins are prepared from the alcohols produced in runs 1 to 8 as follows:

Example 1

A fraction of the product from run 3 (Table I), boiling in the range of 75 to 105° C. at 5 mm. Hg, (about 180–220° C. at 760 mm.) was a water clear liquid having the composition:

Per cent C _____ 75.45
Per cent H _____ 14.42
Per cent O _____ 10.13

This data corresponds to an average molecular formula of $C_{10}H_{22}O$. Infra-red data indicated the product to be a mixture of tertiary alcohols and a cryoscopic molecular weight of 152 identified the fraction as having the average composition of a $C_{10}$-alcohol (m. wt. 158). This average would be expected since the distillation range covered the upper half of the $C_9$-alcohol boiling range and the lower half of the $C_{11}$ range. The original distillation showed no indication of products boiling in the $C_{10}$-tertiary alcohol range.

The fraction was dehydrated by using 0.1 wt. per cent $H_2SO_4$ as catalyst and cyclohexane as entrainer for the water removed during dehydration. The dehydrated product was washed with dilute NaOH (5%) and water to remove residual acid. The cyclohexane remaining in the product was removed by distillation. The product was oxygen-free and gave a bromine number of 109. The average molecular weight was determined cryoscopically as being 135. Infra-red absorption data identified the product as being predominantly type III olefin (strong absorption at 11.24 microns indicating type III olefins, slight absorption at 12.1 microns, the absorbing region of type IV olefins, and no absorption in the region of 10.3 and 10.9 microns, the region of type II and type I olefins respectively). It is therefore concluded from these data that the final product was predominantly a mixture of the two olefins:

and

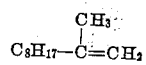

The product with the average composition of a $C_{10}$-olefin would have a molecular weight of 130 and a bromine number of about 107. These data are in very close agreement with experimental data.

Example 2

A fraction of run 2 (Table I), boiling at 140–144° C. at 760 mm. was a tertiary alcohol according to infra-red analysis. The boiling point identifies the alcohol fraction as being predominantly $C_7$ alcohols. When this fraction was dehydrated over alumina at 300±1° C. an unsaturated material was produced having a boiling point plateau at 91.5° C. The bromine number of the total dehydrated sample was 164.9 cg. $Br_2/g$. Strong infra-red absorption at 11.25 microns indicated the product to have a very high type III olefin concentration. No type II olefin was indicated, and only a small amount of type IV was present as shown by infra-red absorption or 12.1 microns. The boiling point of the mixture as well as the bromine number correspond very closely to those calculated for 2-methyl-1-hexene (boiling point 91.1–91.5° C.) $Br_2$ No. 163.

Example 3

A fraction from run 4 boiling in the range of 99–103° C. at 760 mm. was dehydrated over alumina at 320–325° C. The product boiled in the range of 30–38° C. and was identified by infrared analyses as being a mixture of $C_5$ olefins, viz., 2-methyl butene-1 (type III) and 2-methyl butene-2 (type IV) respectively. Infra-red absorption data indicate that the latter type predominated. Inspection of the infra-red data indicate that there was twice as much type IV olefin as type III.

It has been found that 2-alkyl-2-alkanols having less than 7 carbon atoms produced by the reaction of a mono-alkyl methyl carbinol and ethylene (that is, 2-alkyl-2-alkanols containing 5 and 6 carbon atoms per molecule) do not yield a predominance of type III olefin when such alcohols are subjected to dehydration. However, those 2-alkyl-2-alkanols containing 7 and more carbon atoms per molecule do yield a predominance of type III olefins upon dehydration. Example 3 illustrates that a $C_5$ alcohol produced by the reaction of isopropanol with ethylene produces on dehydration a predominance of type IV olefin, and small quantities of type III olefin. This is contrasted with the experimental data typified by Example 4 in which a 2-alkyl-2-alkanol boiling in the $C_7$ range, which demonstrates that a 2-alkyl-2-alkanol containing 7 carbon atoms yields on dehydration 70 to 75% type III olefins and 25–30% type II olefins with no type IV olefins observed.

Example 4

A fraction of the product of run 8 was collected in the boiling range of 125–165° C. at 760 mm., the major portion of the fraction being obtained in the range of 140–144° C. at 760 mm. The total fraction was dehydrated over alumina at 330–345° C. and the product then distilled. Approximately 75% of the sample boiled in the range of 88–93.5° C., fractions being obtained representing 1° C. boiling ranges. All fractions gave bromine numbers in the range of 162 to 165 which correspond to the bromine numbers of quite pure $C_7$ olefins. The olefins were identified as 2-methyl-heptene-1 (type III) and 2-methyl-heptenes-3, -4, and -5 (type II). Infra-red absorption data indicated that the fractions contained 70 to 75% type III olefins and 25 to 30% type II olefins. The latter resulted from shifting of the double bonds of the type III and IV olefins at the high dehydration temperatures, since data shown in Example 2 indicate that the alcohols in the $C_7$ range and dehydrated at 320–325° C., yield quite pure type III olefins and no type II olefins.

Example 5

A portion of the alcohol product from run 8 boiling above 200° C. was dehydrated using 0.06% $H_2SO_4$ as the catalyst with cyclohexane as the water entrainer. Under reflux conditions (80° C.) the dehydration of 2.5 liter of product was completed in two hours. The dehydrated mixture was then treated with 50 g. of Attapulgus clay, with agitation, and then filtered. The filtrate was distilled as follows:

(a) To overhead temperature of 200° C.: 1" x 30" column packed with .16" x .16" protruded stainless steel packing, 10/1 reflux ratio, atmosphere distillation.

(b) To overhead temperature of 320° C.: Same column and reflux ratio, vacuum distillation at 1–3 mm. Hg.

(c) To overhead temperature of 470° C.: Engler distillation at 0.3–0.5 mm. Hg.

The total product taken overhead represented 80% of the sample charged to the still. A number of fractions were taken at regions where plateaus were indicated. These fractions represented about 70% of the total product. Data on these fractions are summarized below:

| Fraction No. | B. Pt. Range of Fraction | Aver. No. C Atoms Per Mole in Frac.[1] | Bromine No., Percent | | Total Olefins |
|---|---|---|---|---|---|
| | | | Theor. | Found | |
| 3 | 180–194 | 11 | 103.5 | 102.2 | 98.9 |
| 6 | 230–240 | 13 | 87.5 | 83.2 | 95.2 |
| 8 | 255–270 | 15 | 75.9 | 71.0 | 93.7 |
| 12 | 300–310 | 17 | 67.0 | 62.0 | 92.5 |
| 14 | 331–353 | 20 | 57.2 | 54.1 | 94.8 |
| 15 | 353–362 | 20.5 | 55.8 | 52.5 | 94.0 |
| 16 | 362–369 | 22 | 52.0 | 51.8 | 99.0 |
| 17 | 369–391 | 22.5 | 48.7 | 45.8 | 94.2 |
| 18 | 391–414 | 25 | 45.7 | 44.8 | 98.1 |
| 19 | 414–434 | 28 | 40.8 | 37.6 | 92.3 |
| 20 | 434–468 | 30 | 38.1 | 37.3 | 97.9 |

[1] Estimated from boiling point data.

In all cases infra-red data indicated that the fractions contained a majority of type III olefins, i. e. 2-methyl-1-alkenes, and as indicated from the above data the fractions contained 92–99% olefins.

Example 6

A fraction of the product from run 7 (co-reaction of 2-butanol and ethylene) representing a mixture of $C_{12}$ and $C_{14}$ tertiary alcohols was dehydrated over alumina at 320–330° C. The product on analysis showed a bromine number of 85. The majority of the product was identified as a mixture of $C_{12}$ and $C_{14}$ olefins of the formula:

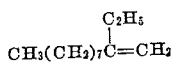

and

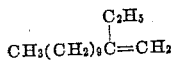

The bromine number of an equal weight mixture of $C_{12}$ and $C_{14}$ olefins would be 88 cg. $Br_2$/g.

Example 7

1100 ml. of 99% isopropanol and 15 ml. of di-tertiary butyl peroxide were charged to a 3 liter-autoclave and the system was then flushed with ethylene. The temperature of the reactor was then raised to 145° C. at which time the pressure was adjusted to 1000# and maintained at this pressure for the duration of the run by continual addition of ethylene. At hours 1, 2, 3 and 4, after reaching reaction temperature, 15 ml. portions of di-t-butyl peroxide were added to the reactor. At the end of the fifth hour the run was terminated.

After distilling unreacted alcohol from the reaction mixture, a total of 580 g. of liquid product was recovered. This product showed strong infra-red absorption in the regions of 3.0 and 8.4–8.6 microns which is indicative of tertiary alcohols. The average molecular weight of the product was determined cryoscopically as being 226 ($C_{15}$-alcohol).

The total product was dehydrated in cyclohexane solution using about 0.1% $H_2SO_4$ as the catalyst. A total of 44 ml. of water was recovered indicating essentially complete dehydration had occurred. The washed and dried product was again examined by infra-red scanning and showed no appreciable absorption at 3.0 microns or 8.4–8.6 microns, but showed strong absorption bands at 6.0 and 11.25 microns. These observations indicate a high concentration of type III olefins in the dehydration product. The bromine number of the dehydrated product was 71.4 cg. $Br_2$/g. indicating an olefin concentration of about 94% (calculated as a $C_{15}$ olefin). The product was composed of olefins of the range $C_5$ to $C_{36}$, the majority of which were type III olefins of the formula

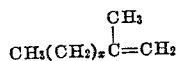

where $x$ is 1 to 31.

Example 8

A product prepared by reacting ethanol with ethylene under the conditions described for run 3 was dehydrated over alumina at 328° C. Infra-red absorption data indicated that a mixture of types I, II and III olefins were obtained, the type II olefins representing the major portion of the product.

Example 9

A product prepared by reacting methanol with ethylene under the conditions described for run 3 was dehydrated over alumina at 325° C. As in the previous example the product contained types I and II olefins, the type II olefins again representing the major portion of the product. Approximately 75–80% of the product was type II olefins and 20–25% type I olefins.

Although the invention has been described with respect to reactions of isopropanol and secondary butanol with ethylene, it is equally applicable to higher secondary aliphatic alcohols wherein the secondary alcohol contains a methyl group attached to the carbinol group, e. g. propyl methyl carbinol, isopropyl carbinol, butyl methyl carbinol, isobutyl methyl carbinol, etc. However, mono-alkyl methyl carbinols containing 3–6 carbon atoms per molecule are the preferred members of the series.

What is claimed is:

1. Process for producing liquid alpha-tertiary mono-olefins of the type:

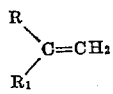

where R is a straight chain alkyl radical of 4 to 30 carbon atoms and $R_1$ is an alkyl radical of 1 to 4 carbon atoms, which comprises reacting a mono-alkyl methyl carbonol with ethylene in the presence of a peroxide activator selected from the group consisting of ditertiary butyl peroxide and tertiary butyl hydroperoxide at a temperature in the range of 100° C. to 250° C. for a period of 1 to 5 hours and at a pressure in the range of 250 to 1500 p. s. i. g. to produce a mixture of 2-alkyl-2-alkanols of the type:

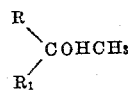

where R is a straight chain alkyl radical of 4 to 30 carbon atoms and $R_1$ is an alkyl radical of 1 to 4 carbon atoms, and dehydrating the mixture of 2-alkyl-2-alkanols to yield alpha tertiary mono-olefins.

2. Process for producing liquid alpha tertiary mono-olefins of the type:

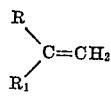

where R is a straight chain alkyl radical of 4 to 24 carbon atoms and $R_1$ is a methyl radical, which comprises reacting isopropanol with ethylene in the presence of a peroxide activator selected from the group consisting of ditertiary butyl peroxide and tertiary butyl hydroperoxide at a temperature of 100 to 200° C. for a period of 1 to 5 hours and a pressure in the range of 500 to 1500 p. s. i. g. to produce a mixture of 2-alkyl-2-alkanols of the type:

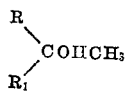

where R is a straight chain alkyl radical of 4 to 24 carbon atoms and $R_1$ is a methyl radical, and dehydrating the mixture of 2-alkyl-2-alkanols to yield a mixture of alpha-tertiary mono-olefins.

3. A process according to claim 1 in which the dehydration of the 2-alkyl-2-alkanol is carried out by distilling the 2-alkyl-2-alkanol with $H_2SO_4$ as a catalyst in the presence of cyclohexane as an entrainer for the water.

4. A process according to claim 1 in which the monoalkyl methyl carbinol contains 3 to 6 carbon atoms per molecule.

5. A process according to claim 1 in which the mono-alkyl methyl carbinol is isopropanol.

6. A process for producing 2-alkyl-1-alkenes containing 7 to 27 carbon atoms per molecule which comprises, reacting isopropanol with ethylene in the presence of di-tertiary butyl peroxide at a temperature of 100-200° C. for a period up to about 5 hours and at a pressure in the range of 500-1500 p. s. i. g. to produce 2-alkyl-2-alkanols containing 7 to 27 carbon atoms per molecule, and dehydrating the 2-alkyl-2-alkanols to yield 2-alkyl-1-alkenes.

7. A process according to claim 6 in which the dehydration is accomplished by distilling the 2-alkyl-1-alkanols at a temperature not above 350° C.

8. A process according to claim 6 in which the dehydration is accomplished by passing the 2-alkyl-2-alkanols over alumina at a temperature of 275–325° C.

9. A process according to claim 6 in which the dehydration is accomplished by distilling the 2-alkyl-2-alkanols with a small catalytic amount of $H_2SO_4$ in the presence of a water entrainer.

10. A process according to claim 9 in which the water entrainer is cyclohexane.

11. A process for producing 2-alkyl-1-alkenes containing 8 to 26 carbon atoms per molecule which comprises reacting secondary butanol with ethylene in the presence of ditertiary butyl peroxide at a temperature of 100–250° C. for a period of about 5 hours and at a pressure of 500–1500 p. s. i. g. to produce 2-alkyl-2-alkanols containing 8 to 26 carbon atoms per molecule, and dehydrating the 2-alkyl-2-alkanols to yield 2-alkyl-1-alkenes.

12. A process according to claim 11 in which the dehydration is accomplished by distilling the 2-alkyl-1-alkanols at a temperature not above 350° C.

13. A process according to claim 11 in which the dehydration is accomplished by passing the 2-alkyl-2-alkanols over alumina at a temperature of 275–325° C.

14. A process according to claim 11 in which the dehydration is accomplished by distilling the 2-alkyl-2-alkanols with a small catalytic amount of $H_2SO_4$ in the presence of a water entrainer.

15. A process according to claim 14 in which the water entrainer is cyclohexane.

FRED W. BANES.
WILLIAM P. FITZ GERALD.

References Cited in the file of this patent

UNITED STATES PATENTS

| Number | Name | Date |
|---|---|---|
| 2,012,785 | Deanesly et al. | Aug. 27, 1935 |
| 2,058,435 | Fisher | Oct. 27, 1936 |
| 2,076,111 | Bannister | Apr. 6, 1937 |
| 2,345,625 | Palmer et al. | Apr. 4, 1944 |
| 2,402,137 | Hanford et al. | June 18, 1946 |
| 2,512,649 | Howard et al. | June 27, 1950 |
| 2,517,732 | Stiteler et al. | Aug. 8, 1950 |

OTHER REFERENCES

Lucas, Organic Chemistry, (Amer. Book Co., N. Y.) 1935, pages 128–129.

Goldwasser et al., "Catalytic Dehydration of $C_6$–$C_8$ Aliphatic Alcohols," Jour. Am. Chem. Soc., vol 61, July 1939, pages 1751–1761.

Richter's Organic Chemistry, vol I (Nordeman Publ., N. Y.) 1944, pages 128–129.

Henne et al., "The Dehydration of Secondary and Tertiary Alcohols," Jour. Am. Chem. Soc., vol. 66, Oct., 1944, pages 1649–1652.